US009641881B2

(12) United States Patent
Pottier

(10) Patent No.: US 9,641,881 B2
(45) Date of Patent: May 2, 2017

(54) AGGREGATION SYSTEM FOR GENERATING AND PROVIDING AN ENRICHED PROGRAM SCHEDULE FOR MEDIA CONTENT

(71) Applicant: Accenture Global Services Limited, Dublin (IE)

(72) Inventor: Alexandre Pottier, Rueil-Malmaison (FR)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 14/809,409

(22) Filed: Jul. 27, 2015

(65) Prior Publication Data
US 2017/0034558 A1   Feb. 2, 2017

(51) Int. Cl.
| | | |
|---|---|---|
| *H04N 5/445* | (2011.01) | |
| *H04N 21/262* | (2011.01) | |
| *H04N 21/235* | (2011.01) | |
| *H04N 21/2665* | (2011.01) | |
| *H04N 21/2668* | (2011.01) | |
| *H04N 21/258* | (2011.01) | |
| *H04N 21/239* | (2011.01) | |
| *H04N 21/482* | (2011.01) | |

(52) U.S. Cl.
CPC ..... *H04N 21/26291* (2013.01); *H04N 21/235* (2013.01); *H04N 21/2358* (2013.01); *H04N 21/2393* (2013.01); *H04N 21/25841* (2013.01); *H04N 21/2665* (2013.01); *H04N 21/2668* (2013.01); *H04N 21/4821* (2013.01)

(58) Field of Classification Search
CPC ................ H04N 21/4622; H04N 21/482
See application file for complete search history.

(56) References Cited

U.S. PATENT DOCUMENTS

| | | | | |
|---|---|---|---|---|
| 5,550,576 A | * | 8/1996 | Klosterman | ....... H04N 5/44543 348/E5.105 |
| 5,589,892 A | * | 12/1996 | Knee | ....... A63F 13/12 348/564 |
| 8,621,519 B2 | * | 12/2013 | Michel | ....... H04N 5/445 348/725 |

(Continued)

OTHER PUBLICATIONS

Jordan, "Liberty Global selects Piksel to help deliver enhanced user experience for TV customers," http://www.piksel.com/pressroom/liberty-global-selects-piksel-to-help-deliver-enhanced-user-experience-for-tv-customers/, Apr. 25, 2016, 3 pages.

*Primary Examiner* — Pankaj Kumar
*Assistant Examiner* — Timothy Newlin
(74) *Attorney, Agent, or Firm* — Harrity & Harrity, LLP

(57) ABSTRACT

A device may receive, from a source device, first information relating to programs provided by a media content service provider. The programs may include media content. The device may generate a program schedule based on the first information. The program schedule may identify a program. The device may publish the program schedule for enrichment using second information that is different from the first information, and may receive the second information based on publishing the program schedule. The second information may include information aggregated from external source devices that are different from the source device. The device may generate an enriched program schedule using the program schedule and the second information.

20 Claims, 13 Drawing Sheets

(56) References Cited

U.S. PATENT DOCUMENTS

| | | | |
|---|---|---|---|
| 8,661,472 B1* | 2/2014 | Kardatzke | H04N 21/482 725/48 |
| 2002/0138837 A1* | 9/2002 | Fries | H04N 5/4401 725/55 |
| 2003/0051246 A1* | 3/2003 | Wilder | H04N 5/44543 725/49 |
| 2003/0226147 A1 | 12/2003 | Richmond et al. | |
| 2004/0078807 A1* | 4/2004 | Fries | H04N 7/165 725/14 |
| 2006/0085826 A1* | 4/2006 | Funk | H04N 7/17318 725/87 |
| 2006/0088276 A1* | 4/2006 | Cho | H04H 60/73 386/230 |
| 2006/0259926 A1* | 11/2006 | Scheelke | H04N 5/4401 725/48 |
| 2008/0066100 A1 | 3/2008 | Broderson et al. | |
| 2009/0112930 A1* | 4/2009 | Anguiano | H04N 5/44543 |
| 2009/0150924 A1* | 6/2009 | Xu | H04N 7/163 725/31 |
| 2011/0078734 A1* | 3/2011 | Lee | H04N 21/4312 725/39 |
| 2011/0173659 A1 | 7/2011 | Lafreniere et al. | |
| 2011/0209178 A1* | 8/2011 | Barrett | H04N 5/44543 725/40 |
| 2012/0005709 A1* | 1/2012 | Walter | H04N 21/2665 725/46 |
| 2012/0159549 A1* | 6/2012 | Douillet | H04N 21/482 725/42 |
| 2012/0216228 A1* | 8/2012 | Padi | H04N 21/4622 725/46 |
| 2012/0324512 A1 | 12/2012 | Cahnbley et al. | |
| 2013/0081075 A1* | 3/2013 | Kulick | G06F 17/30038 725/14 |
| 2013/0268974 A1* | 10/2013 | Sridhar | H04N 21/4126 725/51 |
| 2013/0347037 A1* | 12/2013 | Soroushian | H04N 21/26258 725/39 |
| 2014/0282796 A1* | 9/2014 | Walker | H04N 21/4622 725/116 |
| 2015/0074725 A1* | 3/2015 | Hale | H04N 21/4345 725/49 |
| 2016/0066049 A1* | 3/2016 | Mountain | H04N 21/47214 725/58 |

* cited by examiner

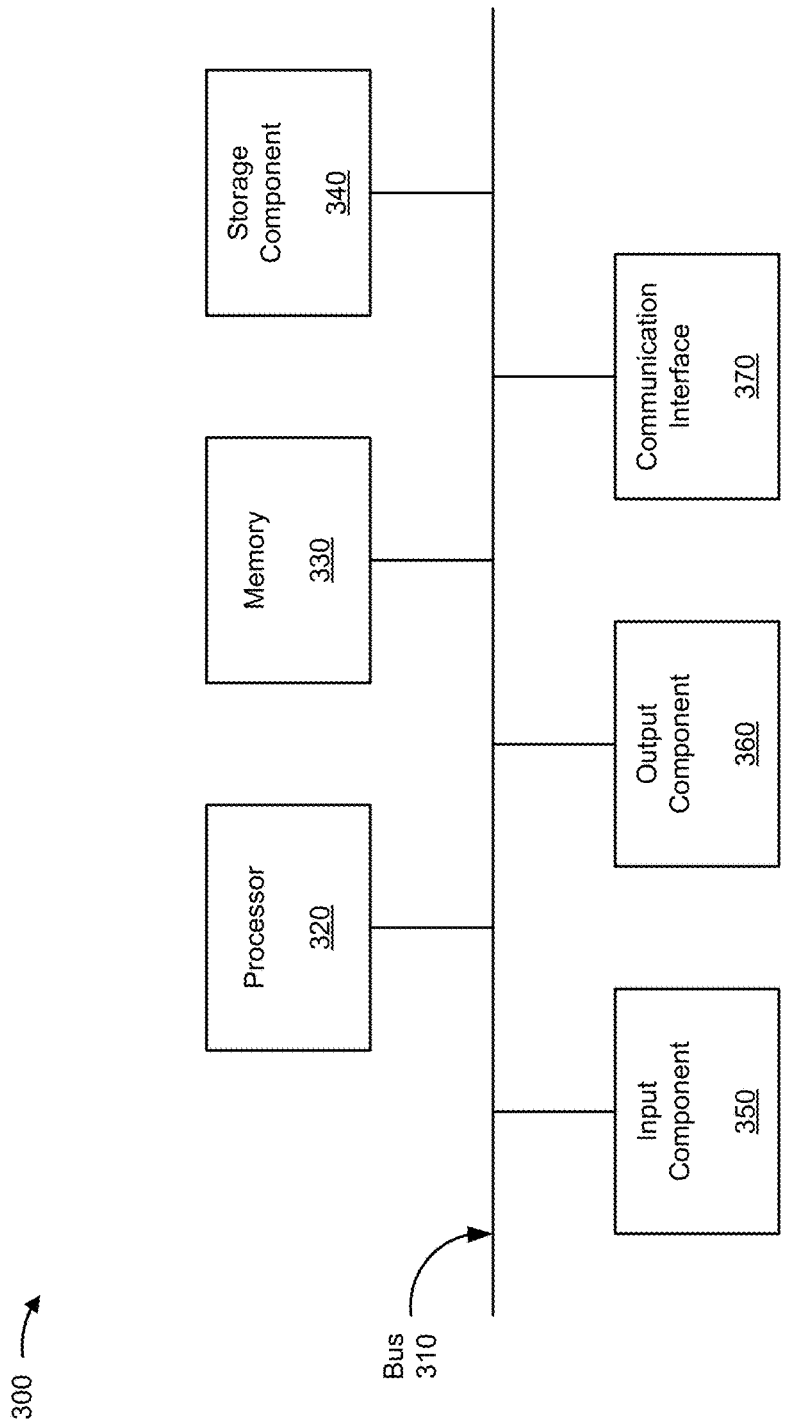

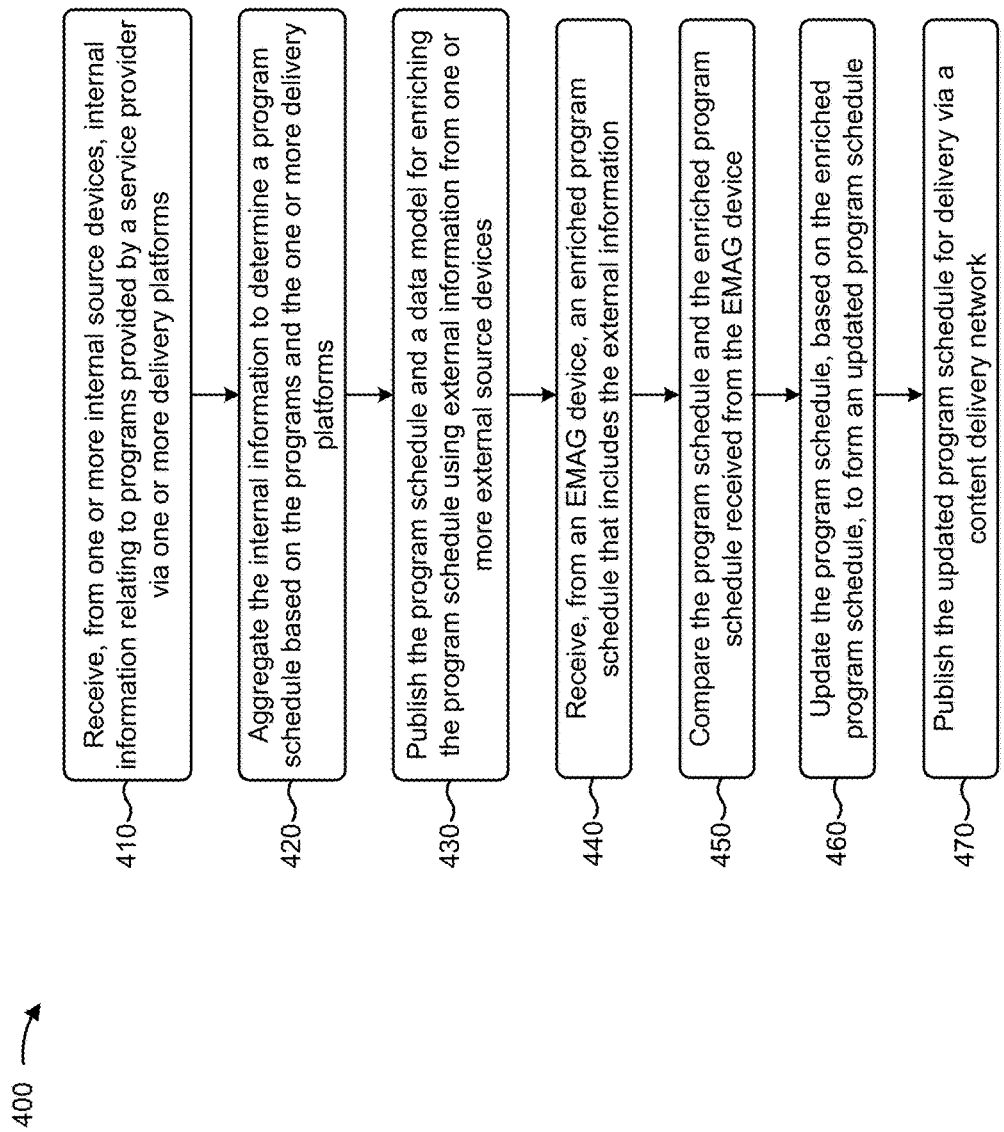

AGGREGATION SYSTEM FOR GENERATING AND PROVIDING AN ENRICHED PROGRAM SCHEDULE FOR MEDIA CONTENT

BACKGROUND

An electronic program guide (EPG) may refer to a menu-based system that provides users of television, radio, and other media applications with continuously updated menus displaying broadcast programming or scheduling information for current and upcoming programming. A non-interactive EPG may include a digitally displayed, non-interactive menu of program scheduling information shown by a television provider to viewers on a dedicated channel. When a viewer tunes to an EPG channel, a menu may be displayed that lists current and upcoming television programs on available channels. An interactive EPG may permit a viewer to navigate scheduling information menus interactively, selecting and discovering programming by time, title, channel, or the like.

SUMMARY

According to some possible implementations, a device may include one or more processors to receive, from one or more source devices, first information relating to a plurality of programs provided by a media content service provider. The plurality of programs may include media content. The one or more processors may generate a program schedule based on the first information. The program schedule may identify at least a program of the plurality of programs. The one or more processors may publish the program schedule for enrichment using second information that is different from the first information, and may receive the second information based on publishing the program schedule. The second information may include information aggregated from a plurality of external source devices that are different from the one or more source devices. The one or more processors may generate an enriched program schedule using the program schedule and the second information.

According to some possible implementations, a computer-readable medium may store one or more instructions that, when executed by one or more processors, cause the one or more processors to receive, from a source device, first information relating to a plurality of programs provided by a media content service provider. The one or more instructions may cause the one or more processors to generate a program schedule based on the first information. The program schedule may identify a program of the plurality of programs. The one or more instructions may cause the one or more processors to publish the program schedule for enrichment using second information. The second information may include information obtained from an external source device that is different from the source device. The one or more instructions may cause the one or more processors to receive the second information based on publishing the program schedule, and to generate an enriched program schedule using the program schedule and the second information.

According to some possible implementations, a method may include receiving, by a device and from a source device, first information relating to a plurality of programs to be delivered by a service provider. The plurality of programs may include media content. The method may include generating, by the device, a first program schedule based on the first information. The method may include publishing, by the device, the first program schedule. The method may include receiving, by the device and based on publishing the first program schedule, second information for enriching the first program schedule. The second information may include information aggregated from a plurality of external source devices that are different from the source device. The second information may be different from the first information. The method may include generating, by the device, a second program schedule based on the first program schedule and the second information. The second program schedule may be different from the first program schedule.

BRIEF DESCRIPTION OF THE DRAWINGS

FIG. 3 is a diagram of example components of one or more devices of FIG. 2;

FIG. 4 is a flow chart of an example process for generating an enriched program schedule for media content (e.g., in non-real time);

DETAILED DESCRIPTION

The following detailed description of example implementations refers to the accompanying drawings. The same reference numbers in different drawings may identify the same or similar elements.

A program schedule for media content (e.g., televisions shows, movies, etc.) may provide basic information about the media content, such as a title, a description, a channel on which the media content is provided, a start time, an end time, or the like. In some cases, the program schedule may be provided via an electronic program guide that permits a user to perform basic actions associated with media content, such as playing the media content, recording the media content, or the like. However, the information about the media content may be limited to internal information stored by devices of a service provider that provides the program schedule and/or the electronic program guide. In some cases, this internal information may be inaccurate, such as when the service provider is unaware of a schedule change to media content or when the service provider devices store inaccurate or out-of-date information. Furthermore, the permissible user actions that may be performed in association with the media content may be limited based on the internal information.

A service provider may want to enrich a program schedule to provide more information (e.g., metadata) about media content, to permit users to perform more actions associated with media content, and/or to increase the accuracy of the program schedule. This may be difficult due to the challenges discussed above, which may be further complicated when a service provider has different program schedules for different geographic regions (e.g., countries, states, cities, service areas, etc.), different languages, different set-top boxes, different delivery platforms (e.g., television, video on demand, over-the-top, etc.), or the like. Implementations described herein assist service providers with enriching program schedules using information from external sources, thereby increasing the quality, reliability, and usefulness of program schedules. Further, implementations described herein may conserve memory and processing resources of service provider devices by relying on external devices for enrichment and/or storage of program schedule information.

Figure 1:
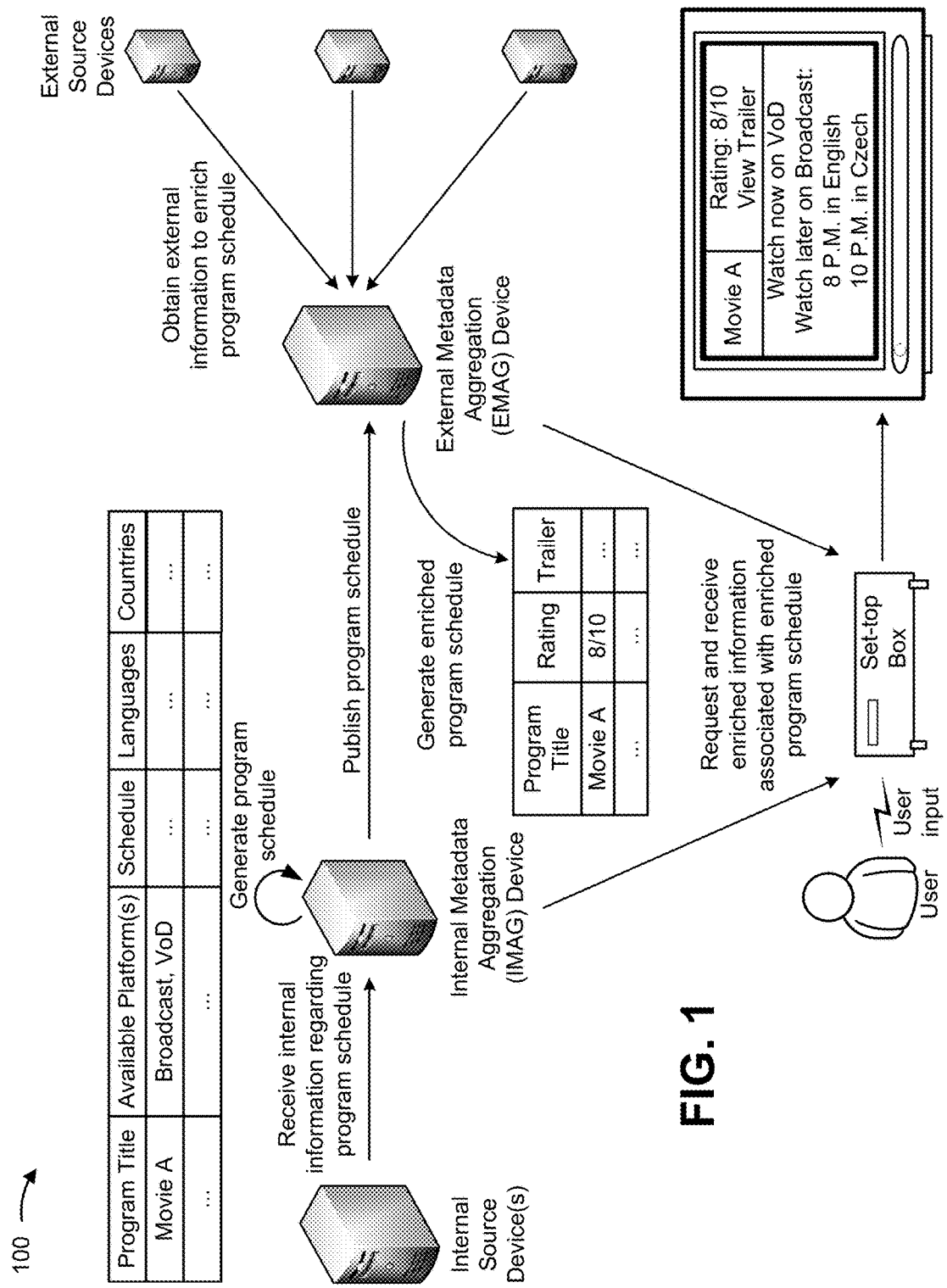
FIG. 1 is a diagram of an overview of an example implementation described herein.

FIG. 1 is a diagram of an overview of an example implementation 100 described herein. As shown in FIG. 1, an internal metadata aggregation (IMAG) device may receive internal information, regarding a program schedule, from one or more internal source devices. As an example, the internal information may include a program title, one or more delivery platforms via which the program is available (e.g., a broadcast television delivery platform, a video on demand delivery platform, a web delivery platform, an over-the-top delivery platform, etc.), a schedule associated with the program (e.g., a start time, an end time, available dates/times, etc.), one or more languages in which the program is available, one or more countries in which the program is available, or the like. The IMAG device may use the internal information to generate a program schedule. In some cases, the internal source device(s) and the IMAG device may be internal to (e.g., owned by, licensed for use by, etc.) a service provider that distributes media content (e.g., a television service provider, an internet service provider, etc.).

As further shown in FIG. 1, the IMAG device may publish the program schedule so that the program schedule may be enriched by one or more external devices. For example, an external metadata aggregation (EMAG) device may subscribe to receive the published program schedule, and may enrich the published program schedule. In some implementations, the IMAG device may publish a data model to identify specific enrichments to be made to the program schedule. The EMAG device may aggregate information (e.g., metadata) from one or more external source devices (e.g., based on the data model), and may use the aggregated information to enrich the program schedule. For example, the EMAG device may enrich the program schedule with rating information from external websites, a movie trailer obtained from an external source device, or the like. In some cases, the external source device(s) and/or the EMAG device may be external to (e.g., not owned by) the service provider.

As further shown, a user may provide input to a set-top box to request enriched information associated with the enriched program schedule. In some implementations, the set-top box may receive the enriched information from the EMAG device, thereby conserving computing resources of the IMAG device. In some implementations, the set-top box may receive the enriched information from the IMAG device, which may use aggregated information to improve the accuracy of the program schedule. In either case, the enriched information may be provided for display via a display device (e.g., a television) in communication with the set-top box.

As an example, and as shown, the enriched information may indicate that a program entitled "Movie A" has a rating of 8 out of 10, is currently available for viewing using video on demand (VOD), and is also available at 8 pm in English and 10 pm in Czech. Further, the user may be permitted to take an action based on the enriched information, such as by viewing a trailer for Movie A. In this way, a service provider may enrich a program schedule using aggregated information from external sources, thereby increasing the quality, reliability, and usefulness of program schedules.

Figure 2:
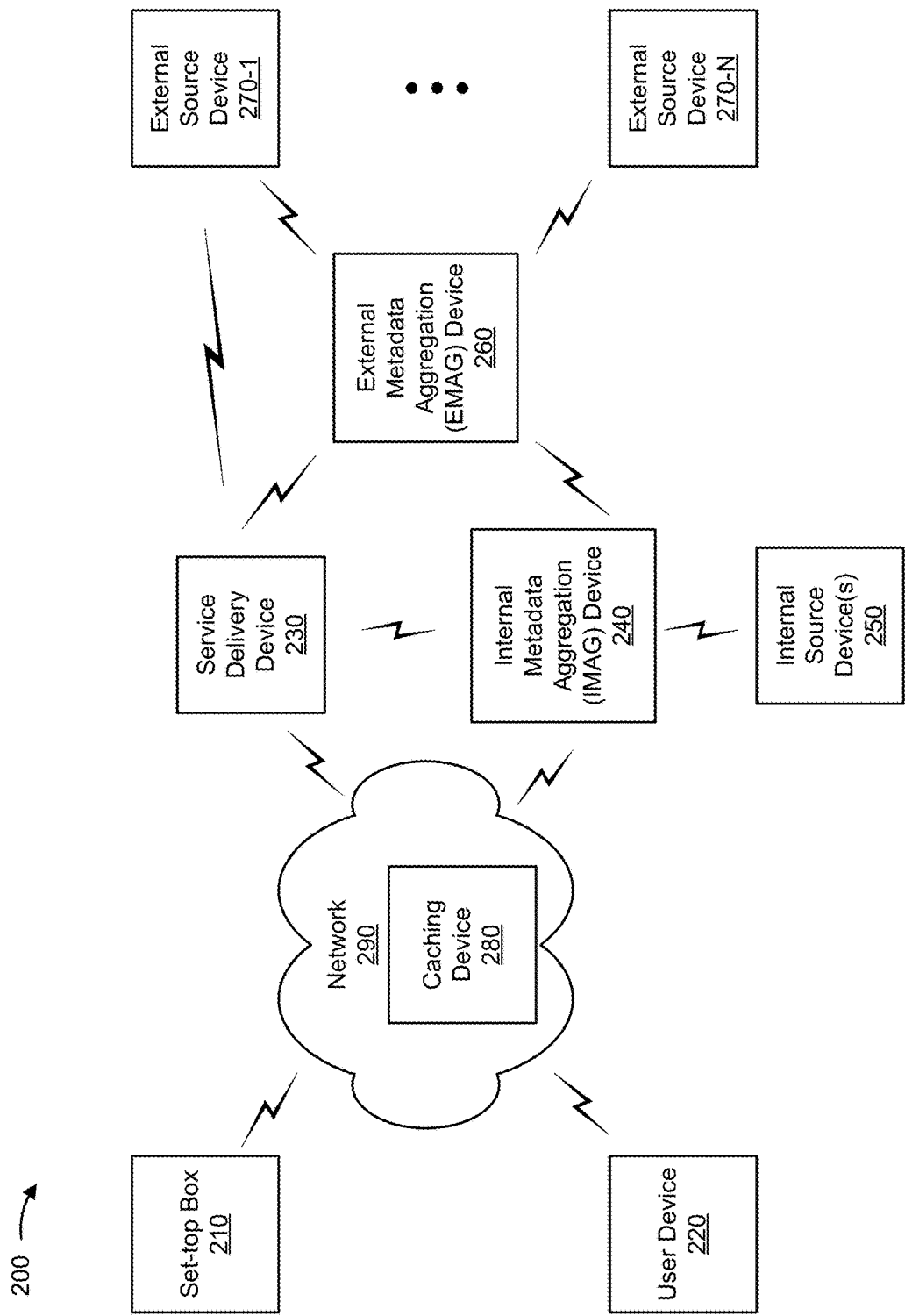
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set-top box 210, a user device 220, a service delivery device 230, an internal metadata aggregation (IMAG) device 240, one or more internal source devices 250, an external metadata aggregation (EMAG) device 260, one or more external source devices 270-1 through 270-N (N≥1) (hereinafter referred to collectively as "external source devices 270," and individually as "external source device 270"), a caching device 280, and a network 290. Devices of environment 200 may interconnect via wired connections, wireless connections, or a combination of wired and wireless connections.

Set-top box 210 may include one or more devices capable of requesting, receiving, transmitting, and/or processing media content, and/or providing the media content to another device for display to a user (e.g., via a display device, such as a television). For example, set-top box 210 may include a set-top box, a casting stick (e.g., a high-definition media interface (HDMI) dongle), a computer, a cable card, a gaming device, a portable electronic device, and/or another type of device capable of receiving, transmitting, and/or processing media content and providing the media content to a display device for presentation to a user. In some implementations, set-top box 210 may request enriched information from IMAG device 240 and/or EMAG device 260 (e.g., directly or via service delivery device 230). Additionally, or alternatively, set-top box may request a program schedule (e.g., an enriched program schedule, an updated program schedule, etc.) from caching device 280.

User device 220 may include one or more devices capable of requesting, receiving, transmitting, and/or processing media content, and/or providing the media content (e.g., for display via user device 220 and/or to another device, such as a television, for display). For example, user device 220 may include a mobile phone (e.g., a smart phone), a laptop computer, a tablet computer, a wearable communication device (e.g., a smart wristwatch, a pair of smart eyeglasses, etc.), or a similar type of device. In some implementations, a user may interact with user device 220 to request enriched information from IMAG device 240 and/or EMAG device 260 (e.g., directly or via service delivery device 230), and/or to request a program schedule from caching device 280. For example, the user may interact with user device 220 to request the enriched information and/or a program schedule instead of or in addition to interacting with set-top box 210 (e.g., using an application executing on user device 220).

Service delivery device 230 may include one or more devices that interact with set-top box 210 and/or user device 220 to request enriched program schedule information from IMAG device 240 and/or EMAG device 260. For example, service delivery device 230 may include a server device (e.g., in a cloud computing environment, a data center, or the like) or a similar type of device. In some implementations, service delivery device 230 may receive user input from set-top box 210 and/or user device 220, may process the user input, and may request information from IMAG device 240, EMAG device 260, external source device 270, caching device 280, and/or another device based on the user input. In some implementations, service delivery device 230 may store a virtual image associated with set-top box 210, such that a user may make requests, associated with set-top box 210, using user device 220.

IMAG device 240 may include one or more devices capable of receiving, generating, storing, processing, and/or providing a program schedule. For example, IMAG device

240 may include a server device (e.g., in a cloud computing environment, a data center, or the like) or a similar type of device. In some implementations, IMAG device 240 may generate a program schedule using internal information from internal source device(s) 250, and may publish the program schedule for enrichment by EMAG device 260. IMAG device 240 may receive an enriched program schedule from EMAG device 260, or may generate an enriched program schedule based on information received from EMAG device 260. In some implementations, IMAG device 240 may store the enriched program schedule, and/or may use the enriched program schedule to improve the accuracy of a program schedule. In some implementations, IMAG device 240 may not store the enriched program schedule (e.g., when EMAG device 260 stores the enriched program schedule). In some implementations, IMAG device 240 may publish the enriched program schedule to caching device 280 for delivery to another device. Additionally, or alternatively, IMAG device 240 may receive a request (e.g., from set-top box 210, user device 220, service delivery device 230, etc.) for enriched information included in the enriched program schedule, and may provide the enriched information based on the request.

Internal source device 250 may include one or more devices capable of storing and/or providing internal information associated with a program schedule. For example, internal source device 250 may include a server device (e.g., in a cloud computing environment, a data center, or the like) or a similar type of device. Internal source device 250 may store internal information, which may be used by a service provider to generate an initial program schedule. In some implementations, IMAG device 240 and internal source device 250 may be internal to (e.g., owned by, licensed for use by, etc.) a service provider that delivers media content based on the program schedule.

EMAG device 260 may include one or more devices capable of receiving, generating, storing, processing, and/or providing external information used to generate an enriched program schedule. For example, EMAG device 260 may include a server device (e.g., in a cloud computing environment, a data center, or the like) or a similar type of device. In some implementations, EMAG device 260 may subscribe to receive a program schedule, published by IMAG device 240, and may enrich the program schedule. EMAG device 260 may receive, aggregate, and/or store external information to be used to enrich the program schedule. In some implementations, EMAG device 260 may aggregate the external information from one or more external source devices 270, which may be owned by different entities. EMAG device 260 may generate an enriched program schedule, and may provide the enriched program schedule to IMAG device 240. In some implementations, EMAG device 260 may store the enriched program schedule. Additionally, or alternatively, EMAG device 260 may receive a request (e.g., from set-top box 210, user device 220, service delivery device 230, etc.) for enriched information included in the enriched program schedule, and may provide the enriched information based on the request.

External source device 270 may include one or more devices capable of storing and/or providing external information used to enrich a program schedule. For example, external source device 270 may include a server device (e.g., a web server, a host server, an application server, a server in a data center, a server in a cloud computing environment, etc.) or a similar type of device. External source device 270 may store external information relating to programs, which may be provided to EMAG device 260 for enrichment of a program schedule. In some implementations, EMAG device 260 and/or external source device 270 may be external to (e.g., not owned by, not licensed for use by, etc.) the service provider that delivers media content based on the program schedule.

Caching device 280 may include one or more devices capable of storing information associated with a program schedule (e.g., a program schedule, an enriched program schedule, an updated program schedule, etc.). For example, caching device 280 may include a server device (e.g., a cache server, a storage server, a server in a data center, a server in a cloud computing environment, etc.) or a similar type of device. In some implementations, caching device 280 may receive a program schedule (e.g., from IMAG device 240 and/or EMAG device 260), and may store the program schedule. Caching device 280 may receive (e.g., from set-top box 210, user device 220, service delivery device 230, etc.) a request for information included in the program schedule, and may provide the requested information. Additionally, or alternatively, caching device 280 may publish the program schedule, and one or more devices may subscribe to receive the program schedule upon publication. In some implementations, caching device 280 may be associated with a content delivery network that delivers media content.

Network 290 may include one or more wired and/or wireless networks. For example, network 290 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In some implementations, network 290 may include an internal network (e.g., an operator network, a service provider network, etc.) that is operated by a service provider that distributes media content. For example, set-top box 210 may access and/or receive information via the internal network. Additionally, or alternatively, network 290 may include an external network (e.g., the Internet) that is not operated by the service provider. For example, user device 220 may access and/or receive information via the external network. Additionally, or alternatively, network 290 may include a content delivery network used to deliver media content to end user devices (e.g., set-top box 210, user device 220, service delivery device 230, etc.). For example, the content delivery device may cache program schedules and/or media content for delivery to the end user devices (e.g., using caching device 280).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to set-top box 210, user device 220, service delivery device 230, IMAG device 240, internal source device 250, EMAG device 260, external source device 270, and/or caching device 280. In some implementations, set-top box 210, user device 220, service delivery device 230, IMAG device 240, internal source device 250, EMAG device 260, external source device 270, and/or caching device 280 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for generating an enriched program schedule for media content (e.g., in non-real time). In some implementations, one or more process blocks of FIG. 4 may be performed by IMAG device 240. In some implementations, one or more process blocks of FIG. 4 may be performed by another device or a group of devices separate from or including IMAG device 240, such as set-top box 210, user device 220, service delivery device 230, internal source device 250, EMAG device 260, external source device 270, and/or caching device 280.

As shown in FIG. 4, process 400 may include receiving, from one or more internal source devices, internal information relating to programs provided by a service provider via one or more delivery platforms (block 410). For example, IMAG device 240 may receive internal information from one or more internal source devices 250. The internal information may relate to one or more programs (e.g., media content), and may include information internal to a service provider that deliver(s) the programs (e.g., a television service provider, a radio service provider, etc.).

In some implementations, the internal information may include program schedule information, which may be used to generate a program guide (e.g., an electronic program guide). For example, the program schedule information may identify one or more programs (e.g., by title, catalog identifier, etc.), a description of a program (e.g., a textual summary of the program), a channel via which the program can be accessed, a start time of the program, an end time of the program, a duration of the program, a genre of the program (e.g., sports, movie, drama, romance, comedy, etc.), or the like. Additionally, or alternatively, the program schedule information may identify one or more languages in which a program is provided, one or more geographic regions in which the program is provided, one or more delivery platforms via which the program can be accessed (e.g., a broadcast television delivery platform, an internet protocol (IP) television delivery platform, a video on demand delivery platform, a web delivery platform, an over-the-top delivery platform, a subscription service or third party service delivery platform, such as HBO, Netflix, Hulu, etc.), or the like. In some implementations, the program schedule information may be determined based on an internal catalog of programs (e.g., a catalog internal to the service provider).

A program may refer to, for example, media content provided via a television delivery platform (e.g., a scheduled show), media content (e.g., an asset) available via a video on demand delivery platform (e.g., a television show, a movie, a video on demand catalog item, etc.), media content available via a third party content provider, such as a web service, an over-the-top content provider, etc. (e.g., a podcast, an HTML video, etc.), or the like.

Additionally, or alternatively, the internal information may include technical information that describes a network used by the service provider to deliver programs. For example, the technical information may describe a network topology of the network, a capability of the network, one or more network devices included in the network, or the like.

Additionally, or alternatively, the internal information may include commercial information associated with the service provider and/or one or more customers of the service provider. For example, the commercial information may identify prices for different programs (e.g., for video on demand programs), a price of a program for a particular customer (e.g., based on a subscription level of the customer, a geographic region associated with the customer, etc.), or the like.

As further shown in FIG. 4, process 400 may include aggregating the internal information to determine a program schedule based on the programs and the one or more delivery platforms (block 420). For example, IMAG device 240 may use the internal information (e.g., aggregated from internal source device(s) 250) to generate a program schedule. The program schedule may include, for example, an electronic program guide. For example, the program schedule may identify programs that can be accessed, channels via which the programs can be accessed, start time and end times between which the programs can be accessed, whether the programs are accessible via a particular service delivery platform (e.g., broadcast television, video on demand, etc.), a price of accessing the programs (e.g., for video on demand services, third party services, subscription services, etc.), languages in which the programs can be accessed, geographic regions in which the programs can be accessed, or the like.

As further shown in FIG. 4, process 400 may include publishing the program schedule and a data model for enriching the program schedule using external information from one or more external source devices (block 430). For example, IMAG device 240 may publish the program schedule so that one or more EMAG devices 260 may obtain the program schedule. For example, EMAG device 260 may subscribe to receive the program schedule upon publication, and may receive the program schedule when the program schedule is published by IMAG device 240. By publishing the program schedule, IMAG device 240 may permit EMAG device 260 to obtain and enrich the program schedule using external information from external source device(s) 270. The external information may include information relating to one or more programs, and may be collected from devices external to the service provider.

In some implementations, the external information may include information not available to IMAG device 240 via internal source device(s) 250. For example, the external information may include a program rating (e.g., 4 out of 5 stars), a program review, a program trailer (e.g., a movie trailer), or the like. In some implementations, the external information may be aggregated from multiple external source devices 270, which may be associated with different third parties. As an example, the external information may include a program rating and/or review obtained from a third party (e.g., from a program rating website, such as Rotten Tomatoes), information regarding a movie cast obtained from another third party (e.g., from a program information website, such as the Internet Movie Database (IMDB)), a program trailer obtained from another third party (e.g., a video website, such as YouTube), information that identifies delivery platforms via which the program is available (e.g., obtained from one or more third party service providers, such as Netflix, HBO, Hulu, etc.), or the like.

Additionally, or alternatively, the external information may include information similar to the internal information available to IMAG device 240 via internal source device(s) 250. For example, the external information may include program schedule information available from a third party (e.g., via external source device(s) 270). In some implementations, IMAG device 240 and/or EMAG device 260 may use this external information to verify the accuracy of internal information. For example, if a threshold quantity of sources (e.g., third parties, external sources, etc.) provide external information that is different from internal information, IMAG device 240 and/or EMAG device 260 may use the external information to replace the internal information, as described in more detail below. In this way, implementations described herein may increase the accuracy of the information included in the program schedule.

In some implementations, IMAG device 240 may provide program schedule information to EMAG device 260 to request enrichment of the program schedule. The program schedule information may include the program schedule and/or a portion of the program schedule. For example, IMAG device 240 may provide, to EMAG device 260, information that identifies one or more programs to be enriched with the external information. Additionally, or alternatively, IMAG device 240 may provide information that identifies one or more types of external information to be used to enrich the programs (e.g., a program rating, a program review, a program trailer, etc.). In this way, implementations described herein may conserve processing resources of EMAG device 260 by not requiring EMAG device 260 to obtain every type of external information.

In some implementations, IMAG device 240 may publish and/or provide a data model that identifies a program to be enriched, a type of external information to be used to enrich the program, and/or a format in which the external information is to be provided. As an example, IMAG device 240 may provide an extensible markup language (XML) data model. EMAG device 260 may obtain and process the data model (e.g., by filling in external information), and may return the processed data model to IMAG device 240, as described below. In this way, implementations described herein may conserve processing resources of IMAG device 240 by not having to parse, interpret, and/or analyze external information provided by EMAG device 260 to identify the external information provided by EMAG device 260.

As further shown in FIG. 4, process 400 may include receiving, from an EMAG device, an enriched program schedule that includes the external information (block 440). For example, IMAG device 240 may receive, from EMAG device 260, an enriched program schedule. EMAG device 260 may generate the enriched program schedule based on information received from and/or published by IMAG device 240 and external source device(s) 270, and may provide the enriched program schedule to IMAG device 240. In some implementations, EMAG device 260 may use a data model, received from and/or published by IMAG device 240, to identify external information to be used to enrich a program schedule (e.g., information associated with one or more programs).

In some implementations, EMAG device 260 may identify external information, requested by IMAG device 240 via the data model, and may link the external information to a program with which the external information is related (e.g., a link to a video on YouTube, a link to a web page, etc.). As an example, EMAG device 260 may search a data structure (e.g., stored by EMAG device 260) to identify the external information. As another example, EMAG device 260 may request the external information from one or more external source devices 270. In some implementations, EMAG device 260 may provide, to IMAG device 240, linkage information that identifies the link between the program and the external information associated with the program. For example, EMAG device 260 may add information to a data model, and may provide the data model with the additional information to IMAG device 240. In this way, IMAG device 240 may receive the enriched program schedule in a particular format so that the enriched program schedule can be processed by IMAG device 240.

In some implementations, EMAG device 260 may store the enriched program schedule. This may permit EMAG device 260 to provide, to service delivery device 230 or another device, enriched information associated with the enriched program schedule (e.g., based on a user request). In this way, memory resources and processing resources of IMAG device 240 may be conserved.

Additionally, or alternatively, IMAG device 240 may store the enriched program schedule (e.g., received from EMAG device 260 or generated based on information received from EMAG device 260). This may permit IMAG device 240 to provide, to service delivery device 230 or another device, enriched information associated with the enriched program schedule (e.g., based on a user request). Furthermore, this may permit IMAG device 240 to update a program schedule with accurate information, as described below. In some implementations, IMAG device 240 may receive a portion of the enriched program schedule, such as one or more types of external information that may be used to update internal information associated with the program schedule. For example, IMAG device 240 may request and/or receive, from EMAG device 260, external information that identifies one or more programs associated with a program schedule, a description of a program, a channel via which a program can be accessed, a start time of a program, an end time of a program, a duration of a program, a genre of a program, one or more languages in which a program is provided, one or more geographic regions in which a program is provided, one or more delivery platforms via which a program can be accessed, or the like.

As further shown in FIG. 4, process 400 may include comparing the program schedule and the enriched program schedule received from the EMAG device (block 450), and updating the program schedule, based on the enriched program schedule, to form an updated program schedule (block 460). For example, IMAG device 240 may receive, from EMAG device 260, external information associated with an enriched program schedule. IMAG device 240 may compare the external information to internal information associated with a program schedule (e.g., an internal program schedule). If the external information is different from the internal information, then IMAG device 240 may update the internal information to form an updated program schedule. Additionally, or alternatively, IMAG device 240 may receive updates to a program schedule from internal source device(s) 250.

For example, if the internal information indicates that a program starts at 8:00 pm, and the external information indicates that the program starts at 8:30 pm, then IMAG device 240 may update the program schedule to indicate that the program starts at 8:30 pm. Examples of program schedule information that may be updated include a title of a program, a description of a program, a channel via which a program can be accessed, a start time of a program, an end time of a program, a duration of a program, a genre of a program, a language in which a program is provided, a geographic region in which a program is provided, a delivery platform via which a program can be accessed, or the like.

In some implementations, IMAG device 240 may update the program schedule based on a threshold. For example, if a threshold quantity of sources (e.g., websites, third parties, external source devices 270, etc.) indicate that a program is associated with particular information (e.g., a title, a genre, a start time, etc.), then IMAG device 240 may update the program schedule to include the particular information for the program. In this way, IMAG device 240 may dynamically update a program schedule as program schedule information changes (e.g., when a start time or duration of a sporting event is changed due to weather, when an end time of a sporting event is changed due to overtime, etc.). Furthermore, IMAG device 240 may improve the accuracy of the program schedule (e.g., by relying on information from multiple sources to generate a more accurate program schedule).

As further shown in FIG. 4, process 400 may include publishing the updated program schedule for delivery via a content delivery network (block 470). For example, IMAG device 240 may publish the updated program schedule. In some implementations, IMAG device 240 may publish the updated program schedule, and the updated program schedule may be obtained by caching device 280, which may be associated with a content delivery network. Caching device 280 may deliver information included in the updated program schedule to an end user device (e.g., upon request from the end user device), such as service delivery device 230, set-top box 210, user device 220, or the like. In some implementations, the end user device may request a program schedule, and caching device 280 may provide the updated program schedule based on the request. In this way, IMAG device 240 may ensure that an up-to-date, accurate program schedule is provided for display to users.

In some implementations, IMAG device 240 may process the program schedule (e.g., an enriched program schedule, an updated program schedule, etc.) before publishing the program schedule. For example, IMAG device 240 may generate different program schedules for different geographic regions (e.g., different service areas associated with different programs). Additionally, or alternatively, IMAG device 240 may generate different program schedules for different languages, different content delivery networks, different subscriptions, or the like. In this way, IMAG device 240 may provide accurate, up-to-date program schedules for a variety of geographic regions, languages, etc.

In some implementations, IMAG device 240 may perform process 400 in non-real time, meaning that the program schedule may be generated, enriched, updated, etc., without a user request. For example, IMAG device 240 may enrich and/or publish the program schedule in advance (e.g., 14 days in advance) of when media content, identified in the program schedule, is to be provided. In this way, IMAG device 240 may conserve processing resources that would otherwise be consumed if the program schedules were generated and enriched in real-time.

In some implementations, a user may request information associated with a program and/or a program schedule, and service delivery device 230 may provide enriched information based on the request, as described in more detail below in connection with FIG. 6. In this way, IMAG device 240 may enrich a program schedule using information from external sources, thereby increasing the quality, reliability, and usefulness of the program schedule.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5F are diagrams of an example implementation 500 relating to example process 400 shown in FIG. 4. FIGS. 5A-5F show an example of generating an enriched program schedule for media content.

Figure 5A:
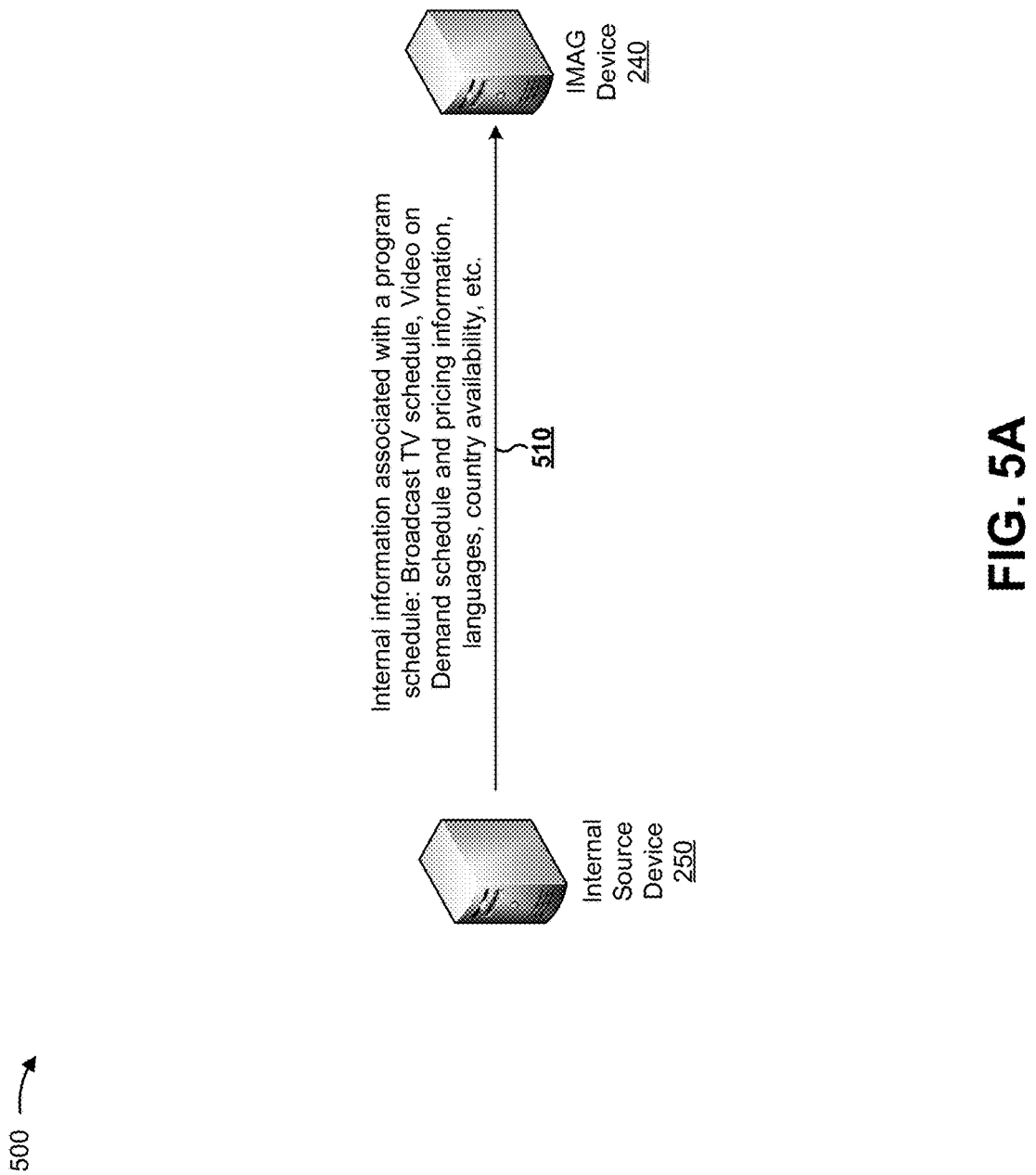
FIGS. 5A-5F are diagrams of an example implementation relating to the example process shown in FIG. 4.

As shown in FIG. 5A, and by reference number 510, assume that IMAG device 240 receives, from internal source device 250, internal information associated with a program schedule. As an example, IMAG device 240 receives a schedule of programs available via a broadcast television platform, a schedule of programs available via a video on demand platform, pricing information for programs available via the video on demand platform, information that identifies languages in which the programs are available, information that identifies countries in which the programs are available, or the like.

Figure 5B:
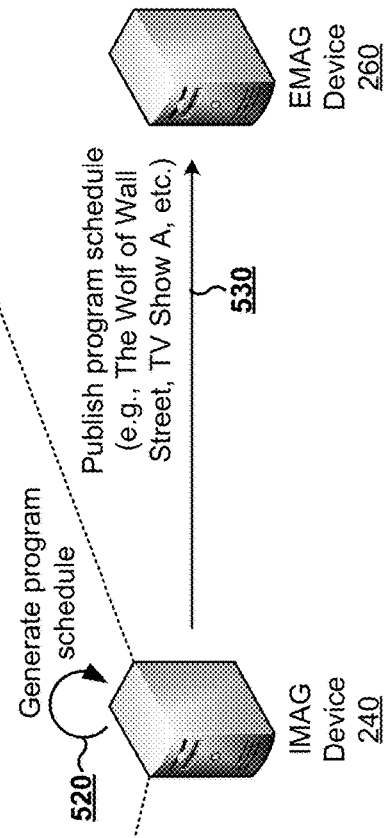

As shown in FIG. 5B, and by reference number 520, IMAG device 240 generates a program schedule based on the internal information. For example, the program schedule indicates that a movie, Wolf of Wall Street, is available via broadcast television on channel 1 at three different times (e.g., Monday from 8 PM-10 PM, Tuesday from 8 PM-10 PM, and Wednesday from 11 PM-1 AM). As further shown, this movie is available via video on demand (VOD) from July 7 through August 12 for $2.99 to rent in standard definition (HD), $4.99 to rent in high definition (HD), and $12.00 to buy. As further shown, this movie is available in the English language, and is available in the United States. Similar information is shown for another program, shown as TV Show A, Episode 1. The internal information and program schedule in FIG. 5B are shown as an example, and additional information, less information, or different information may be included in the internal information and program schedule. As shown by reference number 530, IMAG device 240 may publish the program schedule, so that EMAG device 260 may receive the program schedule for enrichment.

Figure 5C:
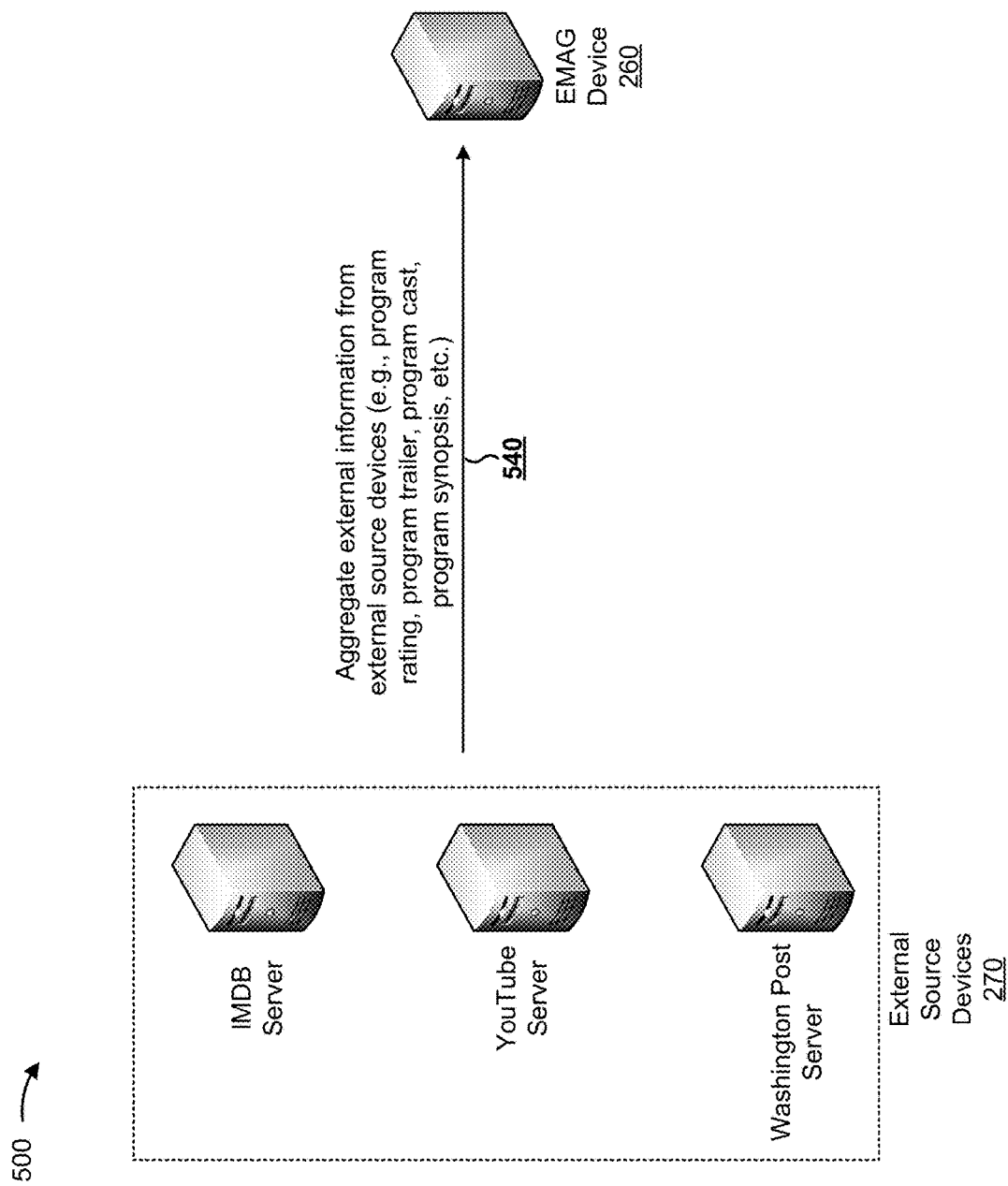

As shown in FIG. 5C, and by reference number 540, using the published program schedule, EMAG device 260 may aggregate external information from external source devices 270. Additionally, or alternatively, EMAG device 260 may have previously aggregated and stored information from external source devices 270, and may search a stored data structure to identify the external information relating to the program schedule generated by IMAG device 240. The external information may identify, for example, a program rating, a program trailer, a program cast, a program synopsis, or the like. As shown, EMAG device 260 may aggregate the external information from external source devices 270 associated with different third parties, such as IMDB, YouTube, and the Washington Post.

Figure 5D:
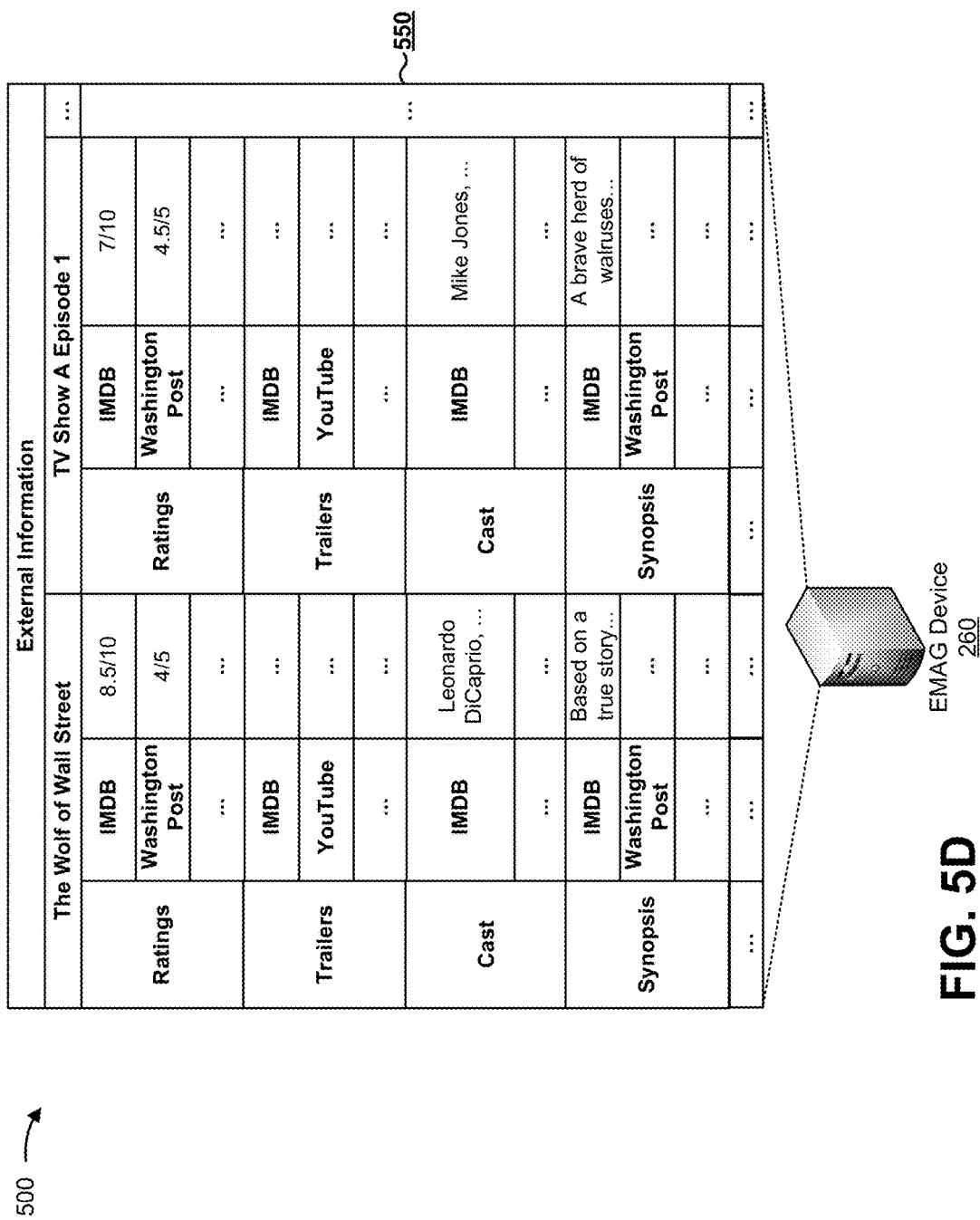

As shown in FIG. 5D, and by reference number 550, EMAG device 260 aggregates the external information for programs included in the program schedule, such as The Wolf of Wall Street and TV Show A Episode 1. As shown, the external information identifies a program rating, a program trailer, a program cast, and a program synopsis. The external information in FIG. 5D is shown as an example, and additional information, less information, or different information may be included in the external information.

Figure 5E:
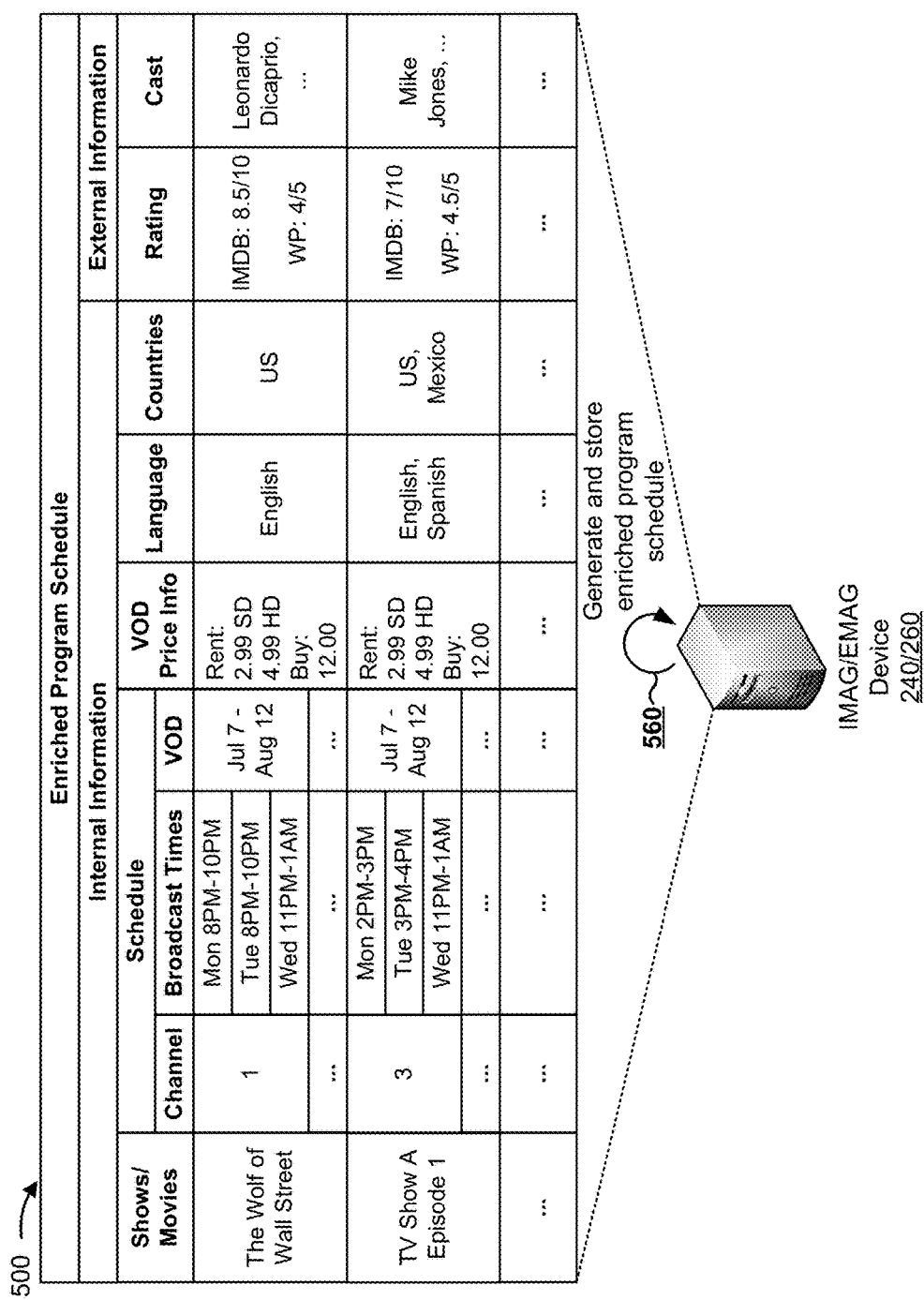

As shown in FIG. 5E, and by reference number 560, IMAG device 240 and/or EMAG device 260 may store the enriched program schedule. In some implementations, IMAG device 240 may provide an internal program schedule to EMAG device 260, and EMAG device 260 may enrich the internal program schedule with external information to generate the enriched program schedule. In this case, EMAG device 260 may store the enriched program schedule and/or may provide the enriched program schedule to IMAG device 240 for storage. Additionally, or alternatively, IMAG device 240 may request external information from EMAG device 260 (e.g., based on a published program schedule and data model), and EMAG device 260 may provide the external information to IMAG device 240. IMAG device 240 may use the external information and an internal program schedule to generate the enriched program schedule. In this case, IMAG device 240 may store the enriched program schedule and/or may provide the enriched program schedule to EMAG device 260 for storage.

As shown, the enriched program schedule may include internal information, such as the internal information described above in connection with FIG. 5B. The enriched program schedule may also include external information, such as the external information described above in connection with FIG. 5D. In this way, the enriched program schedule may provide more complete information associated with programs.

Figure 5F:
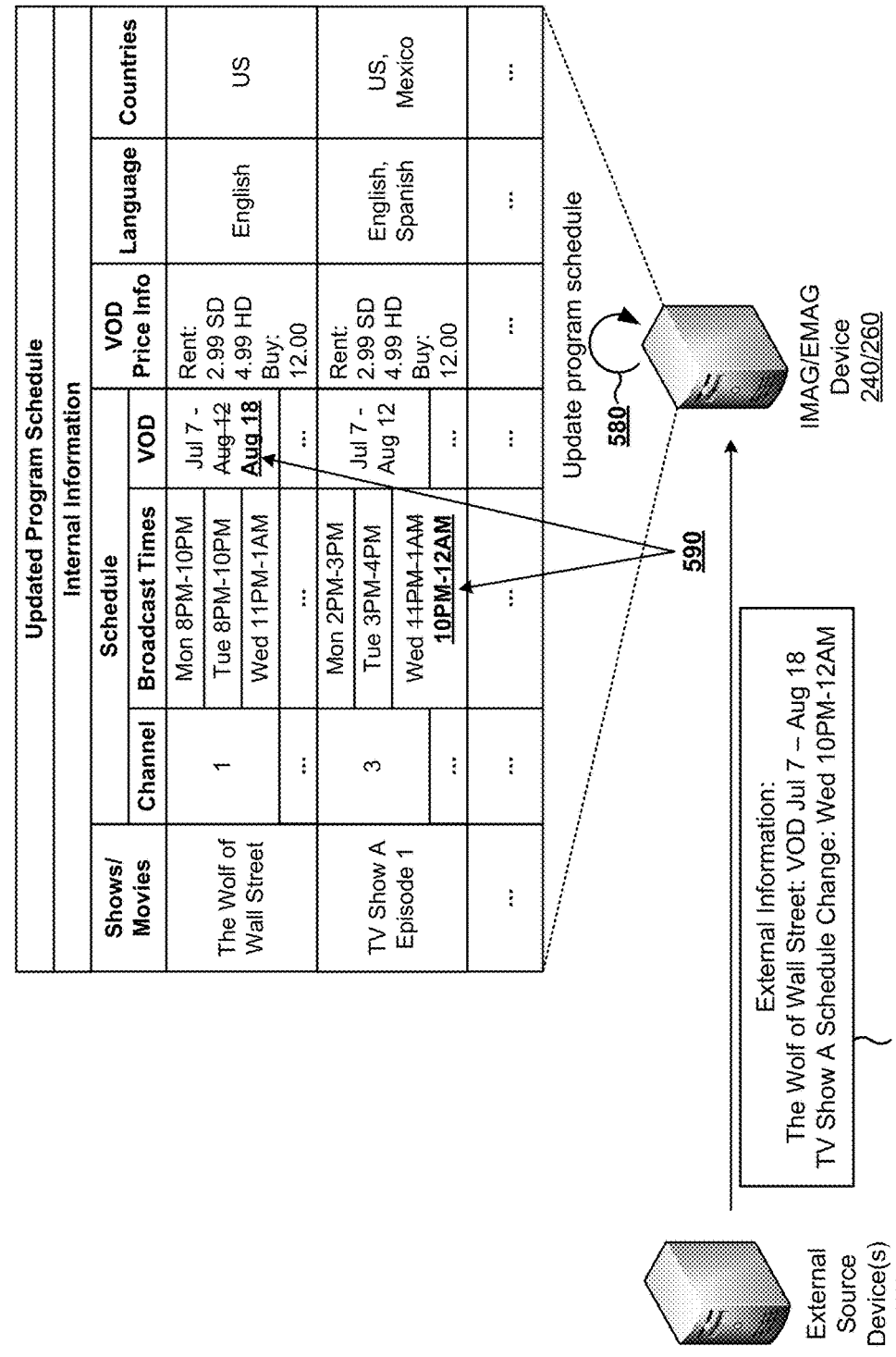

As shown in FIG. 5F, assume that IMAG device 240 and/or EMAG device 260 receives external information that indicates that The Wolf of Wall Street is available via the video on demand platform from July 7 until August 18, and that TV Show A, Episode 1 has had a schedule change from Wednesday from 11 PM-1 AM to Wednesday from 10 PM-12 AM. As shown by reference number 580, IMAG device 240 and/or EMAG device 260 (e.g., depending on which device stores the program schedule) may update the program schedule based on the external information. For example, IMAG device 240 and/or EMAG device 260 may replace previously stored internal information with the newly received external information, as shown by reference number 590. In this way, an accurate, up-to-date program schedule with enriched information may be provided for display to a user, as described in more detail below.

As indicated above, FIGS. 5A-5F are provided merely as an example. Other examples are possible and may differ from what was described with regard to FIGS. 5A-5F.

Figure 6:
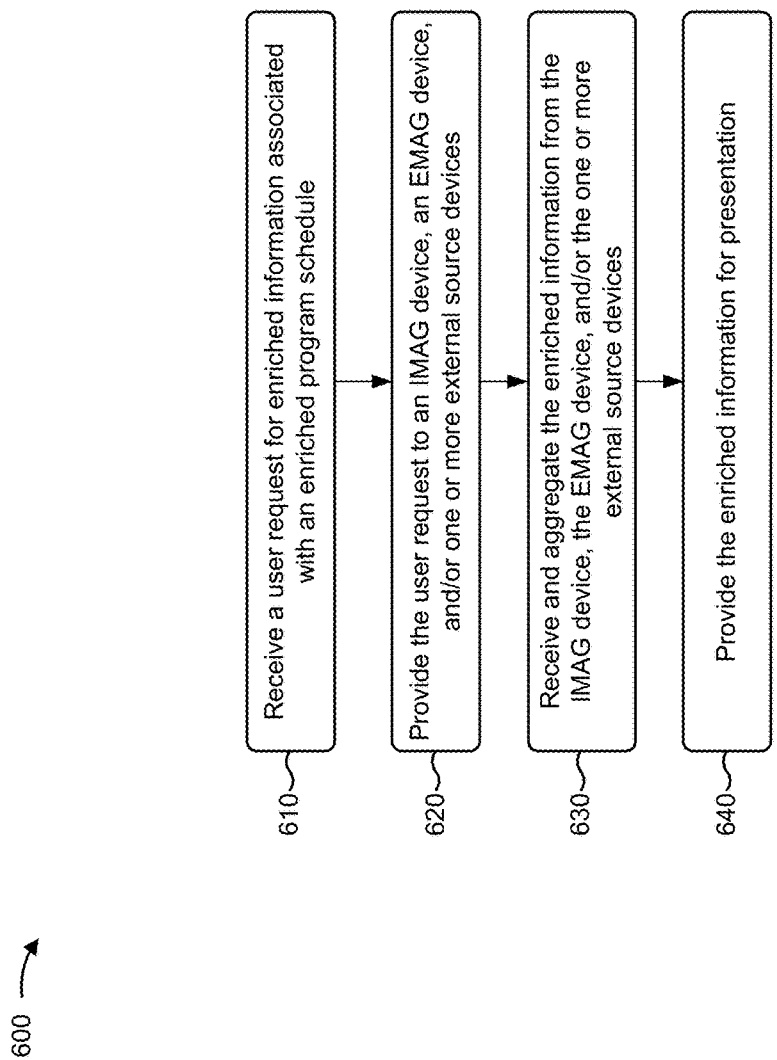
FIG. 6 is a flow chart of an example process for providing enriched information, from an enriched program schedule, based on a user request (e.g., in real time)

FIG. 6 is a flow chart of an example process 600 for providing enriched information, from an enriched program schedule, based on a user request (e.g., in real time). In some implementations, one or more process blocks of FIG. 6 may be performed by service delivery device 230. In some implementations, one or more process blocks of FIG. 6 may be performed by another device or a group of devices separate from or including service delivery device 230, such as set-top box 210, user device 220, IMAG device 240, internal source device 250, EMAG device 260, external source device 270, and/or caching device 280.

As shown in FIG. 6, process 600 may include receiving a user request for enriched information associated with an enriched program schedule (block 610). For example, service delivery device 230 may receive a user request for enriched information. In some implementations, the user request may be received based on user input. For example, a user may provide input to a device (e.g., set-top box 210, user device 220, etc.), and the device may provide the user request to service delivery device 230 based on the input. The request may include a request for enriched information, which may include information that is part of an enriched program schedule (e.g., internal information enriched with external information aggregated from external source device(s) 270, as described above).

As an example, the request may include a request to display an enriched program schedule. Additionally, or alternatively, the request may include a request for enriched information associated with a program included in the program schedule. For example, a user may interact with set-top box 210, user device 220, or the like, to navigate through an electronic program guide that provides information relating to programs and/or program schedules. The user may interact with information that identifies a program to request enriched information associated with the program. In some implementations, the enriched information may include internal information associated with the program (e.g., a program title, a program start time, a program end time, a program duration, a program language, a geographic region in which a program is available, a delivery platform via which the program is available, etc.). Additionally, or alternatively, the enriched information may include external information associated with a program (e.g., a program rating, a program trailer, etc.).

As shown in FIG. 6, process 600 may include providing the user request to an IMAG device, an EMAG device, and/or one or more external source devices (block 620), and receiving the enriched information from the IMAG device, the EMAG device, and/or the one or more external source devices (block 630). For example, service delivery device 230 may provide the user request to IMAG device 240, EMAG device 260, and/or one or more external source devices 270. In some implementations, IMAG device 240 may store enriched information, an enriched program schedule, an updated program schedule, or the like. In this case, service delivery device 230 may provide the user request to IMAG device 240. In some implementations, EMAG device 260 may store enriched information, an enriched program schedule, an updated program schedule, or the like. In this case, service delivery device 230 may provide the user request to EMAG device 260. Additionally, or alternatively, IMAG device 240 and/or EMAG device 260 may not store enriched information requested by a user. In this case, service delivery device 230 may provide the user request to one or more external source devices 270 that store the requested information.

In some implementations, service delivery device 230 may store information that indicates whether enriched information is to be requested from IMAG device 240, EMAG device 260, external source device 270, or the like. Additionally, or alternatively, service delivery device 230 may store a device identifier (e.g., an internet protocol (IP) address, a media access control (MAC) address, etc.) that identifies an IMAG device 240, an EMAG device 260, and/or an external source device 270 from which enriched information is to be requested. In some implementations, service delivery device 230 may request different portions of information from different ones of IMAG device 240, EMAG device 260, and/or external source device(s) 270.

The user request may identify a type of enriched information that is requested, a program for which the enriched information is requested, or the like. IMAG device 240, EMAG device 260, and/or external source device(s) 270 may process the user request to identify the requested enriched information, and may provide the requested enriched information to service delivery device 230. In this way, implementations described herein may conserve resources of IMAG device 240, EMAG device 260, and/or external source device(s) 270 by instructing these devices to process only the type of information requested, and not all stored information.

In some implementations, service delivery device 230 may aggregate the information received from IMAG device 240, EMAG device 260, and/or external source device(s) 270 to generate the enriched information (e.g., requested by the user). For example, service delivery device 230 may obtain information associated with a user request from multiple devices, and may aggregate the obtained information to generate enriched information associated with the user request (e.g., to make sure the information is grouped for the same request).

In some implementations, the requested information may include real time information, such as social media information (e.g., social media trends, comments on media content, etc.), sports information (e.g., live statistics), audience information (e.g., the number of viewers currently watching a program, the number of times a program has been watched or recorded, etc.), or the like.

In some implementations, service delivery device 230 may store (e.g., cache) the enriched information for a threshold amount of time. In this way, if another user requests the same enriched information, service delivery device 230 may conserve processing resources by using the stored enriched information rather than sending another request for the enriched information to IMAG device 240, EMAG device 260, and/or external source device(s) 270. Furthermore, by storing enriched information, service delivery device 230 may be able to more quickly respond to user requests than if the enriched information were not stored and had to be requested again.

As further shown in FIG. 6, process 600 may include providing the enriched information for presentation (block 640). For example, service delivery device 230 may receive the enriched information from IMAG device 240, EMAG device 260, and/or external source device(s) 270, and may provide the enriched information for presentation. In some implementations, service delivery device 230 may provide the enriched information to set-top box 210, which may provide the enriched information to a display device for presentation. Additionally, or alternatively, service delivery device 230 may provide the enriched information to user device 220, which may provide the enriched information for presentation (e.g., output, display, etc.).

A user may provide input to set-top box 210, user device 220, or the like, to interact with the enriched information. For example, the user may navigate and/or browse through the enriched information, may cause a device (e.g., set-top box 210, user device 220, etc.) to perform an action based on a user interaction with the enriched information (e.g., tune to a channel, record a program, provide a trailer, etc.), or the like. In this way, a program schedule that has been enriched with external information, not typically available to a user via a program guide, may be used to enhance a user experience, to increase the accuracy of the program schedule, or the like.

In some implementations, service delivery device 230 may perform process 600 in real time, meaning that the enriched information may be generated, received, provided, etc., based on a user request (e.g., a request to search for enriched information, to browse enriched information, etc.). For example, service delivery device 230 may generate and/or obtain the enriched information in real time or near-real time in response to a user request. In this way, service delivery device 230 may provide real-time, up-to-date information to users.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
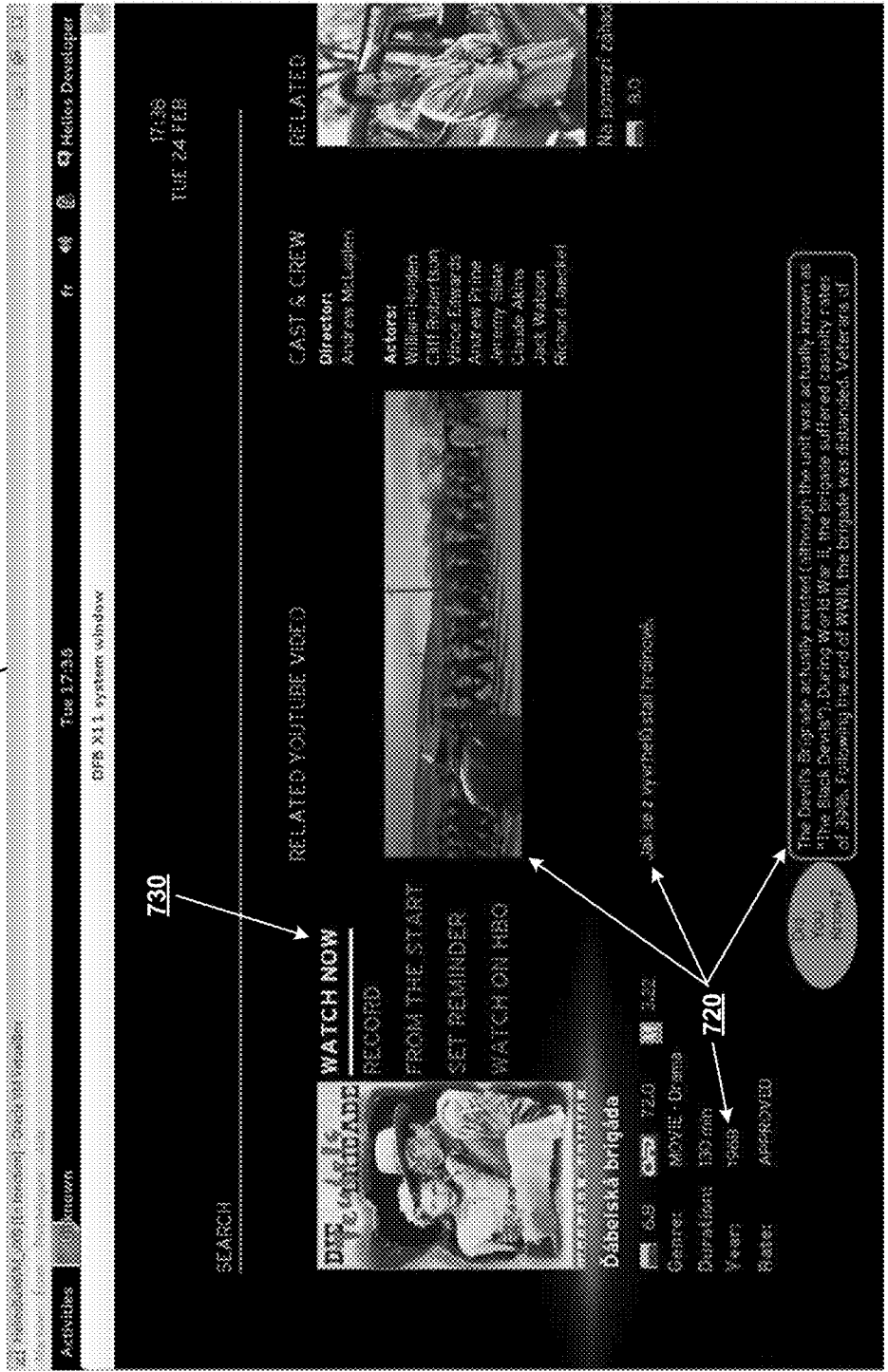
FIGS. 7A and 7B are diagrams of an example implementation relating to the example process shown in FIG. 6.
Figure 7B:
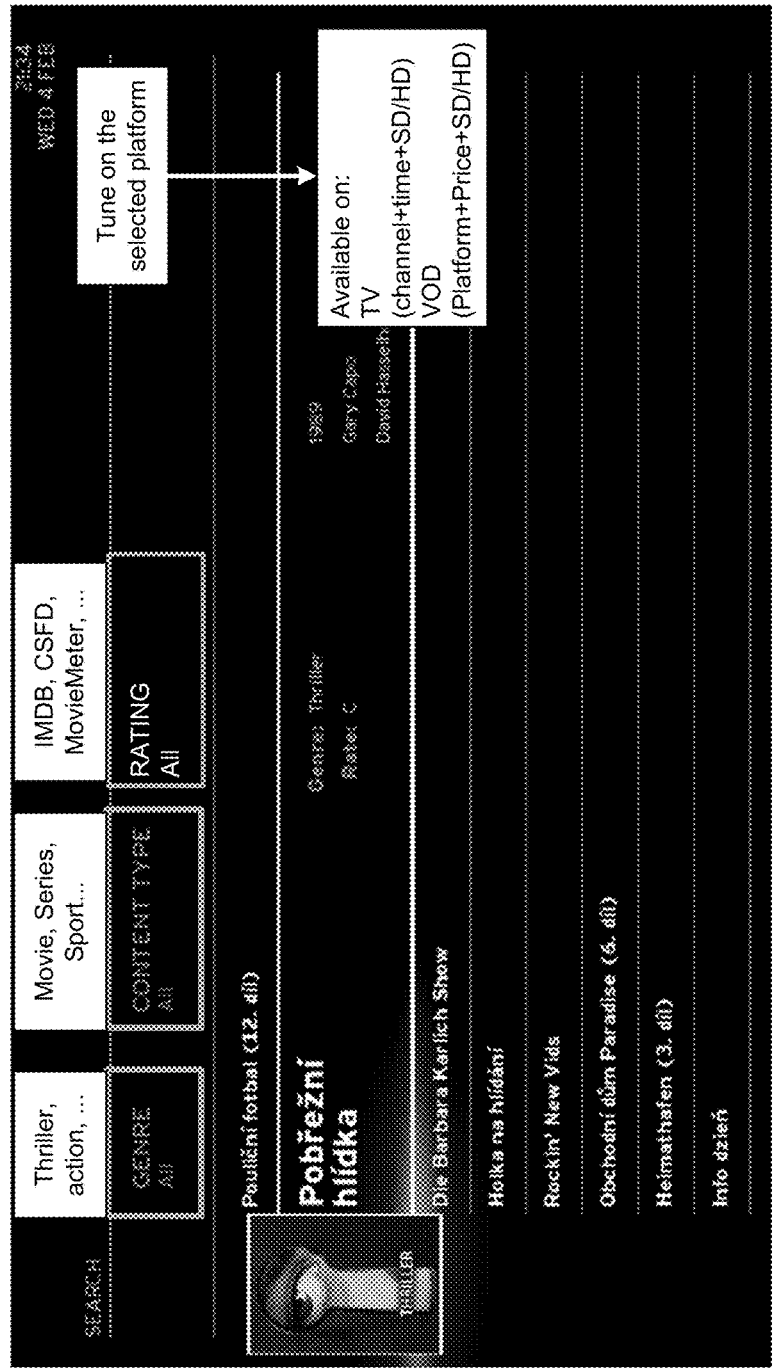

FIGS. 7A and 7B are diagrams of an example implementation 700 relating to example process 600 shown in FIG. 6. FIGS. 7A and 7B show an example of providing enriched information, from an enriched program schedule, based on a user request.

FIG. 7A shows an example of enriched information that may be provided for presentation to a user. For the purpose of FIG. 7A, assume that a user interacts with an electronic program guide, provided via set-top box 210, to request to view enriched information associated with a movie entitled The Devil's Brigade (or Die Teufels Brigade). Further, assume that set-top box 210 provides the request (e.g., directly or via service delivery device 230) to EMAG device 260, which stores the enriched information associated with The Devil's Brigade. Finally, assume that EMAG device 260 provides the enriched information to set-top box 210 based on the user request, and that set-top box 210 provides the enriched information to a display device for presentation to the user, as shown by reference number 710.

As shown by reference number 720, the enriched information may include external information, such as a movie rating from IMDB, a movie rating from another third party website, information regarding a genre of the movie, a duration of the movie, a language of the movie, a year of the movie, a trailer for the movie, a synopsis of the movie, a cast of the movie, other movies that are related to the movie, or the like. As shown by reference number 730, the enriched information may permit the user to take an action with respect to the movie, such as tuning to a channel that is playing the movie, recording the movie, watching the movie via video on demand, or the like. In this way, the enriched information may enhance an experience of the user.

FIG. 7B shows another example of enriched information that may be provided for presentation to a user. As shown in FIG. 7B, a user may search for programs based on a genre, a content type, or the like. As further shown, the enriched information for a program may permit a user to tune to a particular delivery platform to watch the show. For example, based on aggregating external information, set-top box 210 may provide a program schedule that indicates that a particular show is available via broadcast television (e.g., on a particular channel, at a particular time, in a particular format, such as standard definition or high definition, etc.) and video on demand (e.g., using a video on demand platform provided by a particular service provider, such as Amazon, Netflix, HBO, Hulu, etc., at a particular price, in a particular format, etc.).

In this case, the internal information may include information that identifies program availability via broadcast television and a video on demand platform offered by a service provider that delivers the broadcast television. Furthermore, the external information may include information that identifies program availability via other delivery platforms offered by third party service providers (e.g., Amazon, Netflix, HBO, Hulu, etc.). This external information may be aggregated from external source devices 270, as described above. In this way, IMAG device 240 and/or EMAG device 260 may enrich a program schedule to permit a user to see all available options for viewing a program.

As indicated above, FIGS. 7A and 7B are provided merely as an example. Other examples are possible and may differ from what was described with regard to FIGS. 7A and 7B.

Implementations described herein assist service providers with enriching program schedules using information from external sources, thereby increasing the quality, reliability, and usefulness of program schedules. Further, implementations described herein may conserve memory and processing resources of service provider devices by relying on external devices for enrichment and/or storage of program schedule information.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., a set of related items, a set of unrelated items), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive, from one or more source devices, first information relating to a plurality of programs provided by a media content service provider,
the plurality of programs including media content;
generate a program schedule based on the first information,
the program schedule identifying at least a program of the plurality of programs;
publish the program schedule to permit an aggregation device to obtain the program schedule for enrichment using second information,
the second information including information aggregated from a plurality of external source devices that are different from the one or more source devices;
receive, from the aggregation device, an enriched program schedule based on publishing the program schedule,
the enriched program schedule including the second information;
compare the program schedule with the enriched program schedule;
determine that a threshold quantity of external source devices provide a portion of the second information that is different from a portion of the first information; and
update the program schedule based on comparing the program schedule with the enriched program schedule and based on determining that the threshold quantity of external source devices provide the portion of the second information that is different from the portion of the first information; and
publish the updated program schedule for delivery to an end user device.

2. The device of claim 1, where the one or more source devices are associated with the media content service provider; and
where the plurality of external source devices are not associated with the media content service provider.

3. The device of claim 1, where the second information identifies one or more delivery platforms, associated with one or more third party service providers different from the media content service provider, via which the program is accessible; and
where the enriched program schedule includes information that identifies the one or more delivery platforms via which the program is accessible.

4. The device of claim 1, where the program schedule identifies a start time for the program and an end time for the program,
the start time for the program and the end time for the program being associated with delivery of the program via a first delivery platform provided by the media content service provider; and
where the second information identifies a second delivery platform, provided by a third party service provider, via which the program is accessible,
the third party service provider being different from the media content service provider.

5. The device of claim 1, where the one or more processors, when comparing the program schedule with the enriched program schedule, are to:
compare the second information and the first information;
where the one or more processors are further to:
determine that the second information is different from the first information based on comparing the second information and the first information; and
where the one or more processors, when updating the program schedule, are to:
update the program schedule by replacing the first information with the second information.

6. The device of claim 1, where the one or more processors are further to:
receive a user request for enriched information associated with the enriched program schedule; and
provide the enriched information based on the user request.

7. The device of claim 1, where the one or more processors, when publishing the updated program schedule for delivery to the end user device, are to:
publish the updated program schedule for delivery to the end user device via a content delivery network.

8. A non-transitory computer-readable medium storing instructions, the instructions comprising:
one or more instructions that, when executed by one or more processors, cause the one or more processors to:
receive, from a source device, first information relating to a plurality of programs provided by a media content service provider;
generate a program schedule based on the first information,
the program schedule identifying a program of the plurality of programs;
publish the program schedule to permit an aggregation device to obtain the program schedule for enrichment using second information,
the second information including information obtained from an external source device that is different from the source device;
receive, from the aggregation device, an enriched program schedule based on publishing the program schedule,
the enriched program schedule including the second information;
compare the program schedule with the enriched program schedule;

determine that a threshold quantity of external source devices, including the external source device, provide a portion of the second information that is different from a portion of the first information;

update the program schedule based on comparing the program schedule with the enriched program schedule and based on determining that the threshold quantity of external source devices provide the portion of the second information that is different from the portion of the first information; and publish the updated program schedule for delivery to an end user device.

9. The non-transitory computer-readable medium of claim 8, where the source device is associated with the media content service provider; and where the external source device is associated with a third party service provider that is different from the media content service provider.

10. The non-transitory computer-readable medium of claim 8, where the second information identifies a delivery platform, associated with a third party service provider that is different from the media content service provider, via which the program is accessible; and where the enriched program schedule includes information that identifies the delivery platform via which the program is accessible.

11. The non-transitory computer-readable medium of claim 8, where the second information identifies a delivery platform, associated with a third party service provider that is different from the media content service provider, via which the program is accessible; and where the one or more instructions, that cause the one or more processors to publish the updated program schedule for delivery to the end user device, cause the one or more processors to:

publish the updated program schedule for delivery to the end user device, the updated program schedule permitting the end user device to access the program via the delivery platform.

12. The non-transitory computer-readable medium of claim 8, where the first information is associated with a first delivery platform, provided by the media content service provider, via which the program is accessible;

where the second information identifies a second delivery platform, provided by a third party service provider that is different from the media content service provider, via which the program is accessible; and where the updated program schedule includes information that permits a device to access the program via the first delivery platform and the second delivery platform.

13. The non-transitory computer-readable medium of claim 8, where the one or more instructions, that cause the one or more processors to update the program schedule, cause the one or more processors to:

update the program schedule by replacing the portion of the first information with the portion of the second information.

14. The non-transitory computer-readable medium of claim 8, where the one or more instructions, when executed by the one or more processors, further cause the one or more processors to:

generate different program schedules for different geographic regions; and where the one or more instructions, that cause the one or more processors to publish the updated program schedule for delivery to the end user device, cause the one or more processors to:

publish the updated program schedule based on generating different program schedules for different geographic regions.

15. A method, comprising:

receiving, by a device and from a source device, first information relating to a plurality of programs to be delivered by a service provider, the plurality of programs including media content;

generating, by the device, a first program schedule based on the first information;

publishing, by the device, the first program schedule to permit an aggregation device to obtain the first program schedule for enrichment using second information, the second information including information aggregated from a plurality of external source devices that are different from the source device;

receiving, by the device and based on publishing the first program schedule, a second program schedule, the second program schedule including the second information;

comparing, by the device, the first program schedule with the second program schedule;

determining, by the device, that a threshold quantity of external source devices provide a portion of the second information that is different from a portion of the first information;

updating, by the device, the first program schedule based on comparing the first program schedule with the second program schedule and based on determining that the threshold quantity of external source devices provide the portion of the second information that is different from the portion of the first information; and publishing, by the device, the updated first program schedule for delivery to an end user device.

16. The method of claim 15, where the first information is associated with a first delivery platform, provided by the service provider, via which the media content is deliverable;

where the second information identifies a second delivery platform, provided by a third party service provider that is different from the service provider, via which the media content is deliverable; and where the second program schedule includes information that permits access to the media content via the first delivery platform and the second delivery platform.

17. The method of claim 16, where at least one of the first information or the second information includes information in a first language and information in a second language; and where updating the first program schedule comprises:

updating the first program schedule in the first language and the second language.

18. The method of claim 15, further comprising:

receiving, from another device, a user request for information included in the updated first program schedule; and providing the information included in the updated first program schedule to the other device based on receiving the user request.

19. The method of claim 15, where comparing the first program schedule with the second program schedule comprises:

comparing the second information and the first information; and where updating the first program schedule comprises:
   updating the first program schedule, using the second information, based on comparing the second information and the first information.
20. The method of claim 15, further comprising:
identifying a geographic region associated with the updated first program schedule,
   where different program schedules are associated with different geographic regions; and
identifying a content delivery network associated with the geographic region; and
where publishing the updated first program schedule comprises:
   publishing the updated first program schedule to the content delivery network based on identifying the content delivery network.

\* \* \* \* \*